Sept. 25, 1934.        W. B. MACKINTOSH        1,974,680
THERMOSTAT CONTROL FOR RADIATORS
Filed Dec. 28, 1931     2 Sheets-Sheet 1
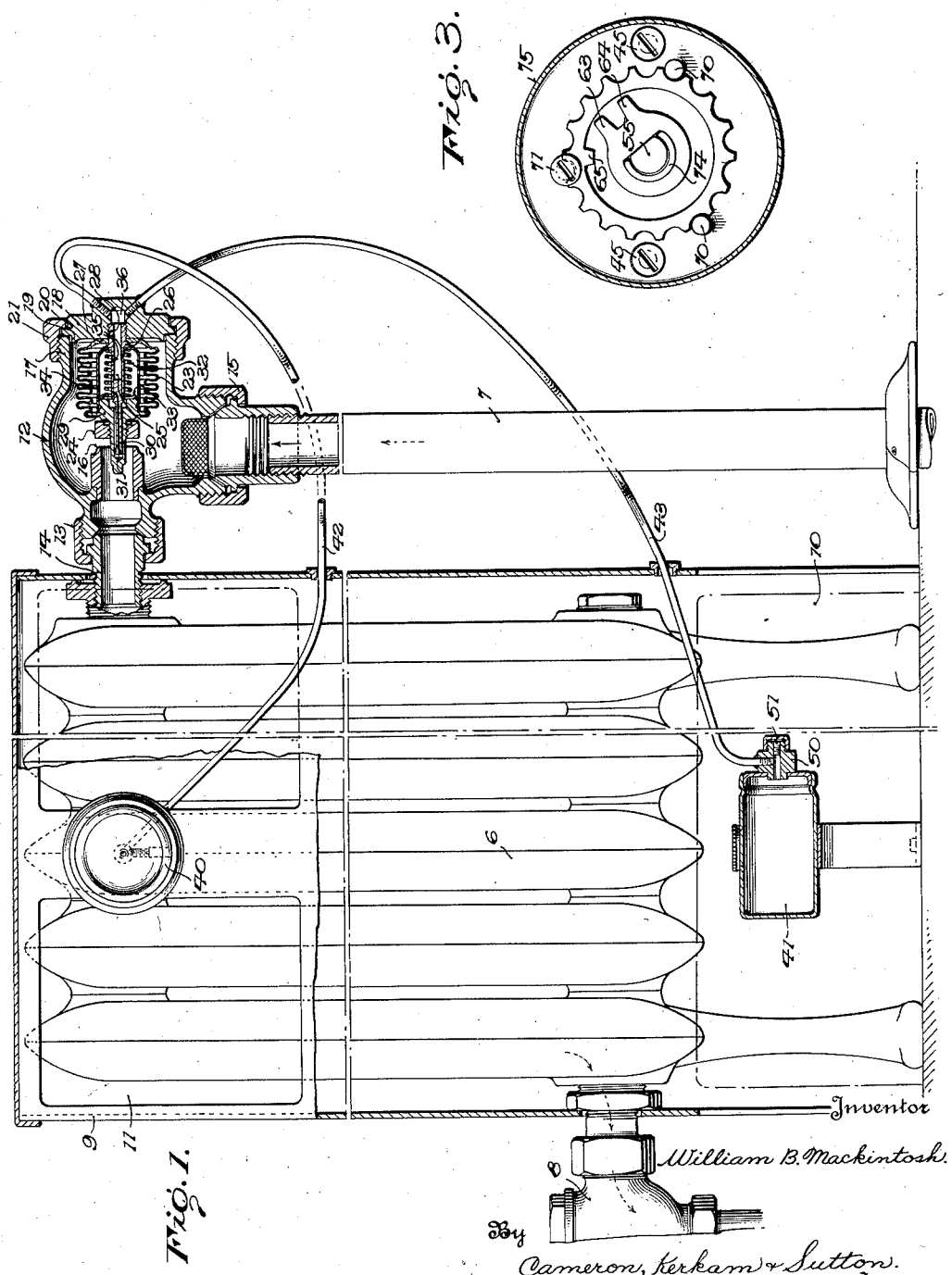

Sept. 25, 1934.    W. B. MACKINTOSH    1,974,680
THERMOSTAT CONTROL FOR RADIATORS
Filed Dec. 28, 1931    2 Sheets-Sheet 2
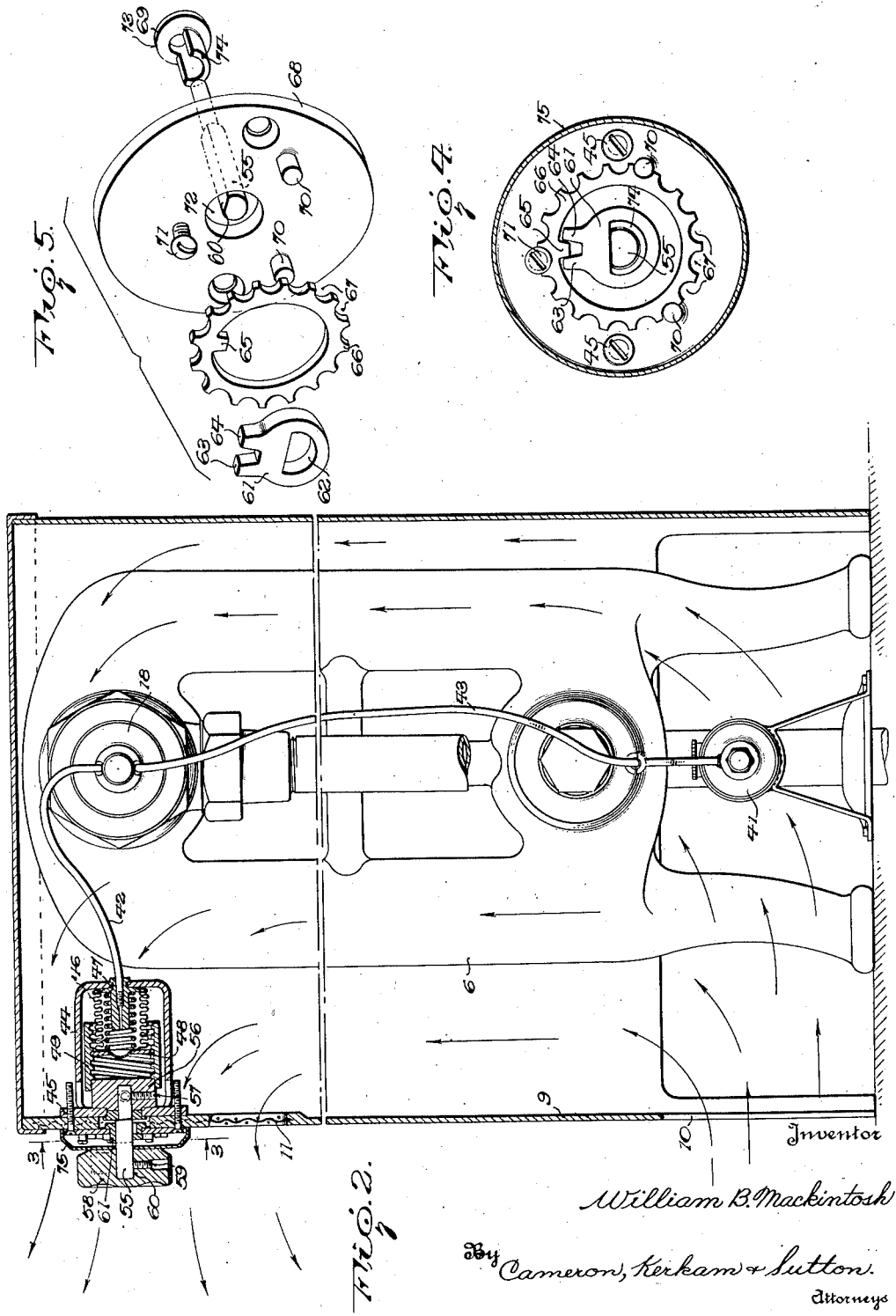

Patented Sept. 25, 1934

1,974,680

UNITED STATES PATENT OFFICE 1,974,680

THERMOSTAT CONTROL FOR RADIATORS

William B. Mackintosh, Knoxville, Tenn., assignor to The Fulton Sylphon Company, Knoxville, Tenn., a corporation of Delaware Application December 28, 1931, Serial No. 583,531

18 Claims. (Cl. 236—37)

This invention relates to a temperature regulator and more particularly to a temperature regulator for controlling the temperature of an ambient by varying the flow of a heating medium through a radiator.

One of the objects of the present invention is to provide a novel method of controlling the flow of a heating medium through a radiator in accordance with changes in the temperature of the air entering and leaving the radiator.

Another object of the present invention is to provide a novel method of controlling the ambient temperatures of a radiator by which the flow of the heating medium is throttled when the temperatures of the air entering or leaving the radiator have increased above predetermined minimums, and by which the flow of the heating medium is stopped when the temperatures increase to predetermined maximums.

Another object of the present invention is to provide a novel method of controlling the ambient temperatures of a radiator by which a high heat transfer is maintained while the temperature of the air entering the radiator is cold but which decreases the heat transfer as the air entering approaches the normal temperature at which the ambient is to be maintained.

Another object of the present invention is to provide a novel method of controlling the flow of a heating medium through a radiator by which variable amounts of a vaporizable liquid are injected into an expansible motor in accordance with conditions of the air at a plurality of points in the current of air flowing past the radiator and vaporized to actuate the motor and control the heating medium.

Another object of the present invention is to provide a novel apparatus for controlling the flow of a heating medium through a radiator in accordance with the temperatures of the air entering and leaving a radiator casing.

Another object of the present invention is to provide a novel apparatus, for actuating the valve mechanism of a radiator, which injects differential quantities of a fluid into the valve mechanism and vaporizes the same therein in accordance with increases in the temperatures of the air entering and leaving the radiator above predetermined minimums.

Another object of the present invention is to provide a novel thermostat and one which has particular utility when used with an apparatus which varies the flow of a heating medium through a radiator in accordance with the temperature of the air flowing past the radiator.

Another object of the present invention is to provide a novel adjusting mechanism for a temperature regulating apparatus.

Another object of the present invention is to provide a novel apparatus for controlling the flow of a heating medium through a radiator which is simple and compact, inexpensive to manufacture and efficient for the purpose intended.

These and other objects will become more apparent from the following description and drawings in which like reference characters denote like parts throughout the several views. It is to be understood, however, that the drawings are for the purpose of illustration only and do not define the limits of the invention, reference being had for this purpose to the appended claims.

In the drawings,

Fig. 1 is a side elevational view partly in section showing the present invention as applied to a radiator;

Fig. 2 is an end elevational view partly in section of the apparatus disclosed in Fig. 1;

Fig. 3 is a front elevational view of the adjusting mechanism for the actuating receptacle shown in Figs. 1 and 2, and is taken on line 3—3 of Fig. 2;

Fig. 4 is a front elevational view of the adjusting means for the actuating receptacle, and is similar to Fig. 3 but shows a different position of the elements;

Fig. 5 is an extended view of the parts constituting the adjusting mechanism for the actuating receptacle shown in Figs. 3 and 4.

The novel method of controlling the flow of a heating medium through a radiator utilizes the effect of the differential temperature between the air entering and leaving the radiator for injecting small quantities of a vaporizable liquid into an expansible motor, and then vaporizing the injected fluid to actuate the motor and a valve mechanism. With this method of control the temperature at one point alone does not govern unless that temperature is excessive, allowing a flow of the heating medium as long as the air entering the radiator is at a sufficiently low temperature so as to maintain the air leaving the radiator below a predetermined maximum for that particular condition.

It is desirable when the temperature of the air entering the radiator remains below a predetermined maximum and the temperature of the air leaving the radiator increases above a predetermined minimum, to decrease the amount of heating medium entering the radiator but not to entirely shut off the supply as the air in the room is not sufficiently heated. Also, when the temperature of the air entering the radiator increases above a predetermined maximum the entire supply of heating medium should be shut off from the radiator as the temperature of the room is sufficiently high.

The method of the present invention includes the varying of the amount of vaporizable liquid injected into the expansible motor for actuating the valve, depending upon which of the temperatures of the entering and leaving air is active in causing injections of the liquid into the motor. When the temperature of the air leaving the radiator increases above a predetermined minimum for a particular condition, small amounts of the vaporizable liquid are injected per increment of differential temperature increase, but when the temperature change is caused by an increase of the temperature of the air entering the radiator, larger quantities of the vaporizable fluid are injected into the motor per same increment of temperature change, causing the motor to entirely shut off the supply of heating medium to the radiator when a predetermined maximum has been reached.

Further it is desirable when the temperature of the air entering the radiator is low to have the valve mechanism of the radiator remain open and allow the greatest transfer of heat possible even though the temperature of the air leaving the radiator is quite high. Also it is desirable to decrease the minimum temperature at which the valve mechanism remains open as the temperature of the air entering the radiator increases and a static condition is approached in which the temperatures of the air entering and leaving the radiator remain constant.

To this end the method includes the varying of the minimum temperature at which the air leaving the radiator will actuate the valve and throttle the flow of heating medium inversely with the maximum temperature at which the air entering the radiator will stop the flow of the heating medium. Preferably the ratio of variation is such that seven or eight degrees decrease in the effective minimum temperature for the air leaving the radiator will be accompanied by an increase of one degree in the effective maximum temperature for the air entering the radiator, or vice versa, but if necessary for particular conditions the invention is intended to include any suitable ratio. Therefore with this method when the temperature of the air entering the radiator increases and the predetermined maximum for that condition is approached, the slight increase in temperature of the air leaving the radiator actuates the valve mechanism to throttle the flow of heating medium and decrease the temperature of the air leaving. With this decrease in the temperature of the air leaving the radiator the predetermined maximum temperature for the air entering the radiator is automatically increased, but the ratio of effect of the two temperatures is such that the predetermined maximum temperature for the air entering the radiator is varied over a very small range, only a few degrees, as compared with the corresponding large variations in the minimum temperature for the air leaving the radiator. This variation continues until a substantially constant condition is reached in which sufficient heat is transferred to the air to cause the temperature of the air entering and leaving the radiator to remain substantially constant.

Referring to Figs. 1 and 2 of the drawings, a novel apparatus for carrying out the method is shown as applied to a usual type of sectional radiator 6 having an inlet conduit 7 and an outlet conduit 8, the conduits being connected in the usual manner with the supply and exhaust mains for the heating medium. A housing 9, having an inlet aperture 10 at the bottom and an outlet aperture 11 at the top, entirely encloses the radiator and directs the circulating air in a restricted path in heat conductive relation with the radiator.

In the illustrated embodiment the controlling means for varying the flow of the heating medium through the radiator is contained in a right angular coupling member 12 having connecting means 13 for engagement with a nipple 14 of the radiator at one end and connecting means 15 for engagement with the inlet conduit 7 at the other end. This hollow coupling 12 is provided interiorly with an annular valve seat 16 in axial alignment with the nipple and connecting means 13 and 14, and with an exteriorly threaded annular boss 17 on the side opposite the connecting means 13, defining a circular opening in the coupling member. A circular plate 18 carrying the controlling means is adapted to fit in the circular opening in the coupling 12 and has an annular recess 19 on one side for engagement with the periphery of the boss 17 and an annular recess 20 on the opposite side for engagement by the flange of a nut 21 having a screw threaded engagement with the boss 17 for holding the plate in position on the coupling member.

The controlling means mounted on this plate 18 and extending into the coupling 12 consists of a flexible bellows 23 constituting a motor element and a valve member 24 adapted for cooperation with the annular valve seat 16. The bellows 23 is mounted on the plate 18 and rigidly attached thereto at one end by means of a spindle 25 extending through the bellows and provided with a shoulder 26 engaging the inner side of the bellows head 27 on one side, and with a screw threaded shank 28 engaging a threaded aperture in the plate 18. When the spindle 25 is properly positioned in the plate 18 the shoulder 26 forces the head 27 of the bellows 23 into tight engagement with the plate 18, this connection being reenforced if necessary with a material such as solder or the like. At the opposite end the bellows 23 is provided with a movable head 29 tightly sealed to the bellows wall in any suitable way and carrying the valve head 24 attached in any suitable manner, illustrated as by a screw threaded connection. The head 29 is guided by an extension of the spindle 30 positioned in a bore 31 of the head. The bellows is normally held in a retracted or collapsed condition by a spring 32 surrounding the spindle 25 and engaging an abutment 33 on the spindle at one end and at the other end engaging a flange on a spider or apertured sleeve 34 that is attached to the movable head 29 of the bellows. As will be apparent, the bellows, being positioned in the coupling 12 and on the side of the valve seat 16 adjacent the inlet conduit 7, is in the path of the heating medium entering the radiator, such as steam, so that the bellows is always subjected to the temperature of the heating medium.

The bellows 23 is normally held in its retracted collapsed position with the valve member 24 out of engagement with the valve seat 16 by means of the spring 32 and is dependent for its operation upon a vaporizable fluid being injected into the bellows, which when vaporized by the heating medium surrounding the bellows, expands the bellows and closes the valve 24. To this end the spindle 25 is hollow for a portion of its length extending from the end engaging the head 18 to a point within the bellows 23. To connect the hollow interior of the spindle 25 with the bellows suitable apertures 35 are provided in the spindle. At the outer end the hollow spindle communicates with a recess 36 in the plate 18 to which the vaporizable fluid is supplied.

The novel apparatus also incorporates the use of a plurality of receptacles for vaporizable liquid which may be of any suitable form and construction and which are positioned in the path of the air entering and leaving the radiator respectively, each of which receptacles upon increases of temperature above a predetermined minimum will cause an injection of a vaporizable liquid into the hot bellows. To this end a receptacle 40 is positioned in the outlet aperture 11 of the housing 9, being shown as positioned centrally of the radiator, while a receptacle 41 is positioned in the inlet aperture 10 of the housing 9, also being shown as centrally positioned with respect to the radiator. These receptacles are adapted either singly or together, upon a sufficient rise of temperature, to inject a vaporizable liquid into the hot motor and the receptacles accordingly are connected by means of conduits 42 and 43 with the recess 36 in the plate 18 which, as previously explained, communicates with the bellows 23 by means of the hollow spindle 25 and apertures 35. The receptacles are in the form of containers for holding a quantity of the vaporizable liquid which upon an increase in temperature will expand and force part of the liquid through the conduits 42 and 43.

The receptacle 40 includes a frame 44 adapted to be rigidly attached to the housing 9 by any suitable means such as that illustrated at 45. Within the frame 44 a flexible bellows 46 is provided having a head 47 rigidly fixed to the frame and into which the conduit 42 extends and is sealed by means of solder or the like. At the opposite end of the bellows 46, a head 48 is provided having a projecting flange with a helical periphery. This flange is adapted for engagement with an internally threaded nut 49 which after once being set is held in a stationary position, but which for purposes of adjustment may be rotated to either extend or contract the bellows, and vary the internal volume of the bellows.

The receptacle 41 is shown in the form of a rigid container of any suitable form having connecting means 50 for the conduit 43 and a charging port 51. The volume of the container 41 is preferably from seven to eight times as large as the container formed by the bellows 45 so that upon a given increment of increase of the temperature in either the receptacles 40 or 41 an expansion of the vaporizable liquid contained therein will be had and an injection of the same into the hot motor, but the quantity of the vaporizable liquid injected from the two receptacles 40 and 41 will be different and vary in proportion to the volumes of the two containers, so that seven to eight times the quantity of fluid will be injected from receptacle 41 as from receptacle 40 upon the same increment change in temperature.

The receptacle 40 includes a novel adjusting means for varying the temperature at which the apparatus will initially operate the motor and valve mechanism. This adjusting mechanism includes a shaft 55 connected at one end to a block 56 by means of a set screw 57 which block in turn is rigidly attached to the internally threaded nut 49. This shaft 55 extends through the connecting means with the housing 9, and is provided at its other end with a handle 58 attached to the shaft by means of a set screw 59. The shaft 55 is provided with a flat portion 60 on which a collar 61 is positioned having an aperture of the same contour as the shaft for rotation therewith. On the periphery of the collar a pair of spaced lugs 63 and 64 are provided and are adapted to embrace an abutment stop 65 if the latter is positioned between the lugs or to engage either outer side of the stop 65 when rotated in one direction or the other. When the lugs 63 and 64 engage the abutment 65 on either side, the shaft is prevented from rotation, but when the abutment is not between the lugs 63 and 64 the handle may be rotated approximately one complete revolution to give a fine adjustment to the receptacle 40 to vary the position of the head 48 and volume of the bellows 46.

The abutment 65 is shown as positioned on and made integral with an annular ring 66 having a series of notches or recesses 67 on its periphery, the ring being adapted to surround the shaft and cooperate with the collar 61. This annular ring 66 is positioned on a plate 68 connected with the frame 44 by means of bolts, screws or the like, and the ring is held in position on the plate by means of pins 70 and a set screw 71 which engage the recesses 67 on the periphery of the ring. With this construction a very close adjustment can be made on the bellows 46, and the ring 66 positioned on the plate 68 with the abutment 65 between the lugs 63 and 64 so that further adjustment is impossible, or a rough adjustment may be made with the ring 66 and the ring then so positioned on the plate 68 that the lugs 63 and 64 do not embrace the abutment 65, thereby allowing the shaft 55, block 56 and nut 49 to be rotated by the handle 58 and a variable adjustment of the receptacle. To provide a good bearing for the shaft 55 in the plate 68 a bushing 69 is provided having a collar 73 engaging one side of the plate 68 and a tubular part 74 extending through an aperture 72 in the plate, the tubular portion 74 being cut away to conform to the contour of the aperture 62 of the collar 61 and the shaft 55. A cover plate 75 is preferably provided between the handle 58 and the plate 68 for enclosing the adjusting mechanism and in giving a neat appearance.

The apparatus operates as follows. Let it be assumed as a starting condition that the room in which the radiator is positioned is cold, so that the air entering the radiator through the aperture 10 at the bottom of the housing 9 is cold, but with the temperature of the air leaving the radiator through the aperture 11 in the housing 9 at a higher temperature due to the heat added from the heating medium of the radiator. At this time the temperatures of the air entering the radiator and leaving the radiator will be below the predetermined minimum for which the apparatus is set and the vaporizable liquid in the receptacles 40 and 41 in a sufficiently contracted condition to withdraw the fluid from the motor bellows 23. The spring 32 then holds the bellows in a contracted position and the valve element 24 open allowing a flow of the heating medium such as steam from the conduit 7 through the radiator 6 to the outlet conduit 8. As this condition continues the air entering the radiator in the room gradually increases in temperature and the air leaving the radiator also increases in temperature until such time as the temperature of the air entering the radiator is at a predetermined minimum and the air leaving the radiator is above a predetermined minimum for that particular condition. At this time the vaporizable liquid in the bellows 46 will have so expanded as to inject a predetermined quantity of the same into the hot bellows 23, which when vaporized extends the bellows and moves the valve 24 toward the valve seat 16. Such throttling action may continue until the valve 24 entirely shuts off the supply of heating medium to the radiator, but in the normal operation of the apparatus, the throttling continues until there is only a sufficient transfer of heat to cause the temperature of the air leaving and the temperature of the air entering the radiator to remain constant.

Injection of liquid from the receptacle 40 into the motor bellows 23 is dependent upon the condition of the liquid in the receptacle 41 because they are in communication through the chamber 36 and the conduits 42 and 43. When the air entering the radiator is at a low temperature and the air leaving the radiator is at a high temperature, the liquid at first ejected from the receptacle 40 will enter the receptacle 41 due to the contracted condition of the liquid therein. This transfer of liquid in effect increases the temperature at which the receptacle 40 will operate the valve, and as the liquid forced over into the receptacle 41 increases the volume of liquid therein, the effect is to decrease the temperature at which the receptacle 41 will actuate the valve. Vice versa, when the temperature of the air leaving the radiator decreases due to a throttling of the heating medium, part of the liquid in the receptacle 41 will be forced over into the receptacle 40 upon an increase in temperature before it will actuate the valve, which in effect decreases the temperature at which the receptacle 40 will actuate the valve and increases the temperature at which the receptacle 41 will actuate the valve. The predetermined minimum and maximum temperatures of the air leaving and entering the radiator at which the valve will be actuated are therefore dependent upon the particular condition of the air itself and each is varied inversely with variations in the other so that when the air entering is cold, the temperature of the air leaving may be high allowing a large heat transfer but when the temperature of the air entering becomes high a much lower temperature of the air leaving will actuate the valve allowing only a small heat transfer. However as the volume of the receptacle 41 is preferably seven to eight times as great as the volume of the receptacle 40 the variation in the temperature of the air entering the radiator at which the valve will be actuated is of small range as compared with the corresponding variation in the temperature of the air leaving so that the temperature of the room may be held substantially constant.

When the condition exists that the air entering the radiator is at a comparatively low temperature, and the temperature of the air leaving becomes undesirably high, sufficient liquid will then be forced over to not only fill the receptacle 41 but also effect the expansion of the motor and throttle the flow of the heating medium. Also when the condition exists where the temperature of the air leaving the radiator remains practically constant and the temperature of the air entering the radiator continues to increase until it becomes greater than the predetermined maximum for that particular condition, then larger quantities of the vaporizable liquid are injected into the motor from the receptacle 41 upon small increases in temperature, and being vaporized by the surrounding heating medium, will close the valve and entirely shut off the supply of heating medium to the radiator. After the heating medium has been shut off from entering the radiator the temperature of the room begins to fall and the air entering the radiator gradually decreases in temperature causing the liquid in the receptacles 40 and 41 to contract and cause a partial vacuum in the conduits 42 and 43 which will extract the fluid from the hot motor and condense the same in the conduits 42 and 43 allowing the spring 25 to partially collapse the bellows and open the valve 24.

The initial temperature at which the apparatus will operate the bellows for a particular condition or in other words the predetermined temperature below which the valve will open or above which the valve will close is regulated and controlled by the controlling mechanism for the receptacle 40. By rotating the handle 58, the shaft 55, block 56, and nut 49, the disk 48 is moved either inwardly or outwardly due to its engagement with the internal threads of the nut which expands or contracts the volume of the bellows 45. An increase in the volume of this bellows will decrease the temperature at which the apparatus initially operates as a greater increase in temperature is necessary to cause sufficient expansion to eject the vaporizable liquid into the motor while on the other hand a decrease in the volume of the bellows 45 will cause a decrease in the starting temperature as a lesser expansion of the liquid is necessary to cause an injection into the hot bellows. In this manner the apparatus may be regulated over a considerable range of temperatures.

As will be readily apparent a novel method and apparatus have been provided for controlling the flow of a heating medium through a radiator in accordance with the differential temperature between the air entering and leaving the radiator. It will also be apparent that the apparatus is simple and compact and efficient for the purpose intended. A variety of mechanical embodiments may be used in place of those disclosed in the drawings without departing from the spirit of the invention, and reference is to be had to the appended claims for a definition of the limits of the invention.

What is claimed is:

1. In a thermostat, a support, a bellows rigidly attached at one end to the support, a disk at the other end of the bellows having a helical periphery, an internally threaded nut engaging the helical periphery of the disk and held against longitudinal movement, and a handle operatively connected to said nut whereby the volume of said bellows may be varied by rotation of the handle.

2. In a thermostat, a support, a bellows rigidly attached at one end to the support and adapted to contain a vaporizable liquid, resilient means within the bellows for holding it in a normally expanded condition, a disk fixed to the other end of the bellows and having a helical periphery, an internally threaded nut engaging the helical periphery of the disk, means cooperating with the nut to prevent longitudinal movement but allowing free rotational movement of the nut, and a handle operatively connected to said nut whereby said nut may be rotated to vary the volume of said bellows.

3. In a thermostat, a support, a bellows having one end rigidly fixed to the support, screw-threaded means cooperating with the other end of the bellows for adjustably varying the volume of the bellows, and a detachable abutment extending from the support for engaging a recess in the screw-threaded means for fixing the screw-threaded means against relative movement after being set in an adjusted position.

4. In a thermostat, a support, a bellows having one end rigidly fixed to the support, an internally threaded nut cooperating with the other end of the bellows for adjustably varying the volume of the bellows, a shaft fixed to said nut, a collar on said shaft having a projection, a detachable abutment extending from the support for engaging either side of the projection on the collar whereby the bellows may be set to an approximate adjustment before the abutment is placed in position on the support and the shaft rotated one revolution to give an accurate adjustment.

5. In a thermostat, a support, a bellows having one end rigidly fixed to the support, a disk connected to the other end of the bellows having a helical periphery, an internally threaded nut engaging the helical disk, a shaft connected to said nut for rotating the same, a detachable annular ring surrounding said shaft and having peripheral notches and an internal depending lug, means engaging the peripheral notches for fixing the ring in position on the support, and a collar rotationally rigid with said shaft having a pair of lugs on its periphery for embracing or engagement with a side of the depending lug on the annular ring.

6. In a controlling mechanism, a support, a controlling member rotatably mounted in the support and fixed at one end to a member to be controlled, a projection on the controlling member, and a detachable abutment extending from the support for engaging the side of the projection whereby the controlling member may be set to an approximate adjustment before the abutment is placed in position on the support and the shaft rotated one revolution to give an accurate adjustment.

7. In a controlling mechanism, a support, a controlling member rotatably mounted in the support and fixed at one end to a member to be controlled, a detachable annular ring on the support surrounding the controlling member and having peripheral notches and an internal lug, means engaging the peripheral notches for fixing the ring in position on the support, and a collar rotationally rigid with said shaft having means on its periphery for embracing or engagement with a side of the lug on the annular ring.

8. The method of regulating the flow of a heating medium through a radiator which includes the steps of passing the air to be heated over the radiator, injecting quantities of a vaporizable liquid into a motor upon increases in temperature of the air receding from the radiator after the temperature of the air approaching the radiator has reached a predetermined minimum, thereafter injecting into said motor quantities of a vaporizable liquid in conformity with variations of temperature in both the air approaching and receding from the radiator, and heating the liquid injected into said motor to vaporize the same and vary the flow of heating medium in conformity with the pressure generated therein.

9. The method of regulating the flow of a heating medium through a radiator which includes the steps of passing the air to be heated over the radiator, injecting quantities of vaporizable liquid into a motor upon increases in temperature of the air approaching the radiator after the temperature of the air receding from the radiator has reached a predetermined minimum, thereafter injecting into said motor quantities of a vaporizable liquid in conformity with variations of temperature in both the air approaching and receding from the radiator, and heating the liquid injected into said motor to vaporize the same and vary the flow of heating medium in conformity with the pressure generated therein.

10. The method of regulating the flow of a heating medium through a radiator which includes the steps of passing the air to be heated over the radiator, injecting quantities of a vaporizable liquid into a motor in accordance with increments of increase in the temperature of the air approaching the radiator above a predetermined minimum, injecting quantities of vaporizable liquid into the motor in accordance with increments of increase in the temperature of the air leaving the radiator above a predetermined minimum, and heating the liquid injected into said motor to vaporize the same and vary the flow of heating medium in conformity with the pressure generated therein.

11. The method of regulating the flow of a heating medium through a radiator which includes the steps of passing the air to be heated over the radiator, injecting quantities of a vaporizable liquid into a motor in accordance with increments of increase in the temperature of the air receding from the radiator above a predetermined minimum, injecting larger quantities of a vaporizable liquid for each increment of temperature change into said motor in accordance with increases in the temperature of the air entering the radiator above a predetermined minimum, and heating the liquid injected into said motor to vaporize the same and vary the flow of heating medium in conformity with the pressure generated therein.

12. In a temperature regulating apparatus for controlling the flow of a heating medium through a radiator, means for varying the flow of the heating medium through the radiator, a motor vessel operatively connected to said means and subjected to a source of heat to provide a vaporizing chamber, and a plurality of receptacles containing a vaporizable liquid and in communication with said motor vessel and with each other, said receptacles being respectively submitted to air approaching said radiator and to air leaving said radiator and adapted respectively to inject quantities of said vaporizable liquid into said motor vessel in conformity with variations of temperature at the respective receptacles.

13. In a temperature regulating apparatus for controlling the flow of a heating medium through a radiator, means for varying the flow of the heating medium through the radiator, a motor vessel operatively connected to said means and subjected to a source of heat to provide a vaporizable chamber, a plurality of receptacles containing a vaporizable liquid and in communication with said motor vessel and with each other, said receptacles being respectively subjected to the temperature of the air approaching said radiator and the temperature of the air receding from said radiator and adapted respectively to inject quantities of said vaporizable liquid into said motor vessel in conformity with variations of temperature at the respective receptacles, and means for adjusting the volume of the system including said receptacles and motor vessel.

14. In a temperature regulating apparatus for controlling the flow of a heating medium through a radiator, means for varying the flow of the heating medium through the radiator, a motor vessel operatively connected to said means and subjected to a source of heat to provide a vaporizing chamber, and a plurality of receptacles containing a vaporizable liquid and in communication with said motor vessel and with each other, said receptacles respectively subjected to the temperature of the air approaching said radiator and the temperature of the air receding from said radiator and adapted respectively to inject quantities of said vaporizable liquid into said motor vessel in conformity with variations of temperature at the respective receptacles and said receptacle in the air approaching said radiator being relatively large as compared with said receptacle in the air receding from said radiator whereby a change in the air temperature approaching said radiator will produce a relatively greater effect upon said motor vessel than a change in the air temperature receding from said radiator.

15. In a temperature regulating apparatus for controlling the flow of a heating medium through a radiator, a housing enclosing the radiator and having an air inlet and an air outlet, a valve in said radiator, a motor vessel in said radiator operatively connected to said valve and subjected to the temperature of the heating medium flowing therethrough to provide a vaporizing chamber, and a pair of receptacles containing a vaporizable liquid and in communication with said motor vessel and with each other, one of said receptacles being in the air inlet and the other of said receptacles being in the air outlet and said receptacles adapted respectively to inject quantities of said vaporizable liquid into said motor vessel in conformity with variations of temperature at the respective receptacles.

16. In a temperature regulating apparatus for controlling the flow of a heating medium through a radiator, a housing enclosing the radiator and having an air inlet and an air outlet, a valve in said radiator, a motor vessel in said radiator operatively connected to said valve and subjected to the temperature of the heating medium flowing therethrough to provide a vaporizing chamber, and a pair of receptacles containing a vaporizable liquid and in communication with said motor vessel and with each other, said receptacles being respectively in the air inlet and the air outlet with the receptacle in the air inlet of relatively larger volume than said receptacle in the air outlet and said receptacles adapted respectively to inject quantities of said vaporizable liquid into said motor vessel in conformity with variations of temperature at the respective receptacles.

17. In a regulator for controlling the flow of a heating medium through a radiator, in combination with a valve for varying the flow of the heating medium through the radiator, an expansible and collapsible motor vessel connected to said valve and subjected to a source of heat whereby said motor vessel provides a vaporizing chamber, and a system in communication with said motor vessel for predeterminately injecting quantities of a vaporizable liquid into said motor vessel whereby said liquid is vaporized in said vessel by the heat applied thereto and said vessel actuated, said system including a plurality of receptacles for said vaporizable liquid in communication with said motor vessel and each other and respectively subjected to the temperature of the air approaching said radiator and the air receding from said radiator whereby the quantity of vaporizable liquid injected into said motor vessel varies with the temperature differential between said receptacles.

18. In a regulator for controlling the flow of a heating medium through a radiator, in combination with a valve for varying the flow of the heating medium through the radiator, an expansible and collapsible motor vessel connected to said valve and subjected to a source of heat whereby said motor vessel provides a vaporizing chamber, and a system in communication with said motor vessel for predeterminately injecting quantities of a vaporizable liquid into said motor vessel whereby said liquid is vaporized in said vessel by the heat applied thereto and said vessel actuated, said system including a plurality of receptacles for said vaporizable liquid in communication with said motor vessel and each other and respectively subjected to the temperature of the air approaching said radiator and the air receding from said radiator whereby the quantity of vaporizable liquid injected into said motor vessel varies with the temperature differential between said receptacles, said receptacle subjected to the temperature of the approaching air being larger than said receptacle subjected to the receding air whereby an increase or decrease in the temperature of the approaching air decreases or increases respectively the minimum temperature at which the receptacle subjected to the receding air may effect operation of said motor vessel.

WILLIAM B. MACKINTOSH.